US012676420B2

(12) United States Patent
Ji et al.

(10) Patent No.: US 12,676,420 B2
(45) Date of Patent: Jul. 7, 2026

(54) TUNABLE FREQUENCY SELECTIVE SURFACE STRUCTURE

(71) Applicant: BEIHANG UNIVERSITY, Beijing (CN)

(72) Inventors: Jinzu Ji, Beijing (CN); Peilin Huang, Beijing (CN); Jiayi Zhang, Beijing (CN)

(73) Assignee: BEIHANG UNIVERSITY, Beijing (CN)

( * ) Notice: Subject to any disclaimer, the term of this patent is extended or adjusted under 35 U.S.C. 154(b) by 30 days.

(21) Appl. No.: 18/727,227

(22) PCT Filed: Jan. 9, 2023

(86) PCT No.: PCT/CN2023/071320
§ 371 (c)(1),
(2) Date: Jul. 8, 2024

(87) PCT Pub. No.: WO2023/083389
PCT Pub. Date: May 19, 2023

(65) Prior Publication Data
US 2025/0047006 A1 Feb. 6, 2025

(30) Foreign Application Priority Data
Nov. 9, 2021 (CN) ......................... 202111320455.8

(51) Int. Cl.
*H01Q 15/00* (2006.01)
*H01Q 1/42* (2006.01)

(52) U.S. Cl.
CPC ........... *H01Q 15/002* (2013.01); *H01Q 1/425* (2013.01)

(58) Field of Classification Search
CPC .. H01Q 15/002; H01Q 1/425; H01Q 15/0086; H01Q 15/0026
See application file for complete search history.

(56) References Cited

U.S. PATENT DOCUMENTS

2003/0071763 A1* 4/2003 McKinzie, III .... H01Q 15/0013 343/754
2006/0114170 A1 6/2006 Sievenpiper

FOREIGN PATENT DOCUMENTS

CN 111478050 A 7/2020
CN 112821085 A 5/2021
(Continued)

OTHER PUBLICATIONS

International Search Report from International Application No. PCT/CN2023/071320 Feb. 9, 2023, 2 pgs.
(Continued)

*Primary Examiner* — Dimary S Lopez Cruz
*Assistant Examiner* — Anna N Hamadyk
(74) *Attorney, Agent, or Firm* — Tutunjian & Bitetto, P.C.

(57) ABSTRACT

Provided is a tunable frequency selective surface (FSS) structure, including: a dielectric substrate and a rectangle resonant component arranged on the dielectric substrate. The rectangle resonant component includes a plurality of perforated rectangle resonant units arranged in a matrix; the perforated rectangle resonant units each include two identical rectangle perforated metal patches, and a varactor diode arranged between the two rectangle perforated metal patches, where the two rectangle perforated metal patches are arranged in a mirror image relation. In the rectangle resonant component, the varactor diodes in the perforated rectangle resonant units in the same row are arranged in a same direction, and the varactor diodes in the perforated rectangle resonant units in adjacent rows are arranged in opposite directions. The present application can achieve the continuous tunable performance of a stopband in a specific frequency band.

8 Claims, 6 Drawing Sheets

(56) References Cited

FOREIGN PATENT DOCUMENTS

| | | | |
|---|---|---|---|
| CN | 113097736 | A | 7/2021 |
| CN | 113346254 | A | 9/2021 |
| CN | 114024146 | A | 2/2022 |

OTHER PUBLICATIONS

Chinese Office Action for Application No. 202111320455.8 issued Jul. 20, 2022.

* cited by examiner

TUNABLE FREQUENCY SELECTIVE SURFACE STRUCTURE

CROSS REFERENCE TO RELATED APPLICATION

The present application is a national stage application of International Patent Application No. PCT/CN2023/071320, filed on Jan. 9, 2023, which claims priority to the Chinese Patent Application No. 202111320455.8, filed with China National Intellectual Property Administration (CNIPA) on 9 Nov. 2021 and entitled "TUNABLE FREQUENCY SELECTIVE SURFACE STRUCTURE", which is incorporated herein by reference in its entirety.

TECHNICAL FIELD

The present disclosure relates to the technical field of microwaves, and in particular, to a tunable frequency selective surface structure.

BACKGROUND

A frequency selective surface (FSS) is composed of a large number of metal unit resonant components regularly arranged on a dielectric substrate or open slot units periodically arranged on a metal screen. The shape of the units, the arrangement of the units, and the electrical properties of the dielectric affect the frequency selection characteristics of the FSS. The FSS has selective characteristics for electromagnetic waves with different operating frequencies, different polarization modes and different incident angles. Due to the spatial filtering characteristics, the FSS is widely applied to military and wireless communication systems.

The FSS is often applied in the fields of aircraft stealth, hybrid radome stealth, electromagnetic compatibility and electromagnetic shielding. The main principle is to design a required frequency band on a passband of the FSS, and design a frequency band that is prone to electromagnetic interference on a stopband of the FSS, thereby facilitating the transmission and reception of signals and the normal operation of equipment. From the perspective of stealth, the low radar cross-section shape is convenient to scatter enemy detection signals into the surrounding space, greatly weakening echoes in the detection direction while not affecting normal communications of own party, thereby improving the stealth and anti-interference performance of the aircraft. An ideal FSS has low loss in the passband and the characteristic of quickly rolling off into the stopband on the outer side of the passband, and for the transmittance of the stopband, the lower the better.

The FSS has a profound impact on the development of weapon systems. The conventional FSS has certain defects, such as poor protection, large size, and non-tunability, and once the structure is designed, the corresponding performance cannot be changed.

SUMMARY

To solve at least one defect in the background art, the present disclosure provides a tunable frequency selective surface (FSS) structure to achieve the continuous tunable performance of a stopband in a specific frequency band.

To achieve the above objective, the present disclosure provides the following solutions:

A tunable frequency selective surface (FSS) structure, including a dielectric substrate and a rectangle resonant component arranged on the dielectric substrate, where the rectangle resonant component includes a plurality of perforated rectangle resonant units arranged in a matrix; the perforated rectangle resonant units each include two identical rectangle perforated metal patches, and a varactor diode arranged between the two rectangle perforated metal patches, where the two rectangle perforated metal patches are arranged in a mirror image relation; and in the rectangle resonant component, the varactor diodes in the perforated rectangle resonant units in the same row are arranged in a same direction, and the varactor diodes in the perforated rectangle resonant units in adjacent rows are arranged in opposite directions.

Optionally, the rectangle perforated metal patches are each provided with three rectangle holes, namely, a first rectangle hole, a second rectangle hole, and a third rectangle hole; and the first rectangle hole and the second rectangle hole are symmetrically arranged on two sides of the third rectangle hole.

Optionally, the first rectangle hole includes two parallel transverse edges and two parallel vertical edges; the second rectangle hole includes two parallel transverse edges and two parallel vertical edges; the third rectangle hole includes two parallel transverse edges and two parallel vertical edges;

one end of a first transverse edge of the third rectangle hole is connected to one end of a first transverse edge of the first rectangle hole, the other end of the first transverse edge of the third rectangle hole is connected to one end of a first transverse edge of the second rectangle hole, and the first transverse edge of the third rectangle hole, the first transverse edge of the first rectangle hole and the first transverse edge of the second rectangle hole are located on a same horizontal line;

one end of a second transverse edge of the third rectangle hole is connected to one end of a second transverse edge of the first rectangle hole, the other end of the second transverse edge of the third rectangle hole is connected to one end of a second transverse edge of the second rectangle hole, and the second transverse edge of the third rectangle hole, the second transverse edge of the first rectangle hole and the second transverse edge of the second rectangle hole are located on a same horizontal line; and a first vertical edge of the third rectangle hole and a first vertical edge of the first rectangle hole are the same, and a second vertical edge of the third rectangle hole and a first vertical edge of the second rectangle hole are the same.

Optionally, the rectangle perforated metal patches each further include a first extended edge and a second extended edge;

the first extended edge is an edge passing through a first marking end to extend outward, and the second extended edge is an edge passing through a second marking end to extend outward;

the first marking end is the other end of the first transverse edge of the first rectangle hole, and the second marking end is the other end of the first transverse edge of the second rectangle hole; and in the rectangle resonant component, the perforated rectangle resonant units in the same row are connected together through the first extended edge and the second extended edge, such that the varactor diodes in a same row are in parallel connection.

Optionally, the tunable FSS structure further includes a first feed metal wire and a second feed metal wire, where the first feed metal wire is connected to one end of a first marking extended edge in the perforated rectangle resonant units in a first column of the matrix, and the second feed metal wire is connected to one end of a second marking extended edge in the perforated rectangle resonant units in a last column of the matrix;

the perforated rectangle resonant units each include a first rectangle perforated metal patch and a second rectangle perforated metal patch; when the perforated rectangle resonant units are located in odd-numbered rows of the matrix, the first marking extended edge is a first extended edge of the first rectangle perforated metal patch, and when the perforated rectangle resonant units are located in even-numbered rows of the matrix, the first marking extended edge is a first extended edge of the second rectangle perforated metal patch; when the perforated rectangle resonant units are located in odd-numbered rows of the matrix, the second marking extended edge is a second extended edge of the second rectangle perforated metal patch, and when the perforated rectangle resonant units are located in even-numbered rows of the matrix, the second marking extended edge is a second extended edge of the first rectangle perforated metal patch; and in an operation process, when the varactor diodes have anodes connected to the first rectangle perforated metal patch and cathodes connected to the second rectangle perforated metal patch, when the first feed metal wire is connected to a positive pole of an external power supply, the second feed metal wire is connected to a negative pole of the external power supply, and when the varactor diodes have anodes connected to the second rectangle perforated metal patch and cathodes connected to the first rectangle perforated metal patch, when the first feed metal wire is connected to the negative pole of the external power supply, the second feed metal wire is connected to the positive pole of the external power supply.

Optionally, the transverse edges of the first rectangle hole and the transverse edges of the second rectangle hole are all 1 mm long; the transverse edges of the third rectangle hole are 4 mm long; the vertical edges of the first rectangle hole and the vertical edges of the second rectangle hole are all 4.3 mm long; and the vertical edges of the third rectangle hole are 3.8 mm long.

Optionally, the varactor diodes have a capacitance range of 0.3-2.22 pF; and the varactor diodes have an on-load voltage range of 0-20 V.

Optionally, the perforated rectangle resonant units each have dimensions of 16 mm×10 mm, and the rectangle perforated metal patches each have dimensions of 8 mm×4.6 mm.

Optionally, in the perforated rectangle resonant units, every two of the rectangle perforated metal patches have a gap of 0.4 mm, and the varactor diodes are located at the gaps.

Optionally, the dielectric substrate is an FR4 substrate, and has a thickness of 0.4 mm.

According to specific embodiments provided in the present disclosure, the present disclosure has the following technical effects:

The present disclosure provides a tunable FSS structure, which employs specific metal patterns and varactor diodes to change the equivalent resistance between adjacent rectangle perforated metal patches, thereby achieving continuous adjustability of a stopband in a specific frequency band.

BRIEF DESCRIPTION OF THE DRAWINGS

To describe embodiments of the present disclosure or technical solutions in the prior art more clearly, the accompanying drawings required in the embodiments are briefly introduced below. Obviously, the accompanying drawings described below are only some embodiments of the present disclosure. Those of ordinary skill in the art can also obtain other accompanying drawings according to these accompanying drawings without creative efforts.

DETAILED DESCRIPTION OF THE EMBODIMENTS

The technical solutions of the embodiments of the present disclosure are clearly and completely described below with reference to the drawings in the embodiments of the present disclosure. Apparently, the described embodiments are merely a part rather than all of the embodiments of the present disclosure. All other examples obtained by a person of ordinary skill in the art based on the examples of the present disclosure without creative efforts shall fall within the protection scope of the present disclosure.

An objective of the present disclosure is to provide an FSS structure tunable continuously in multiple wave bands. The present invention achieves the frequency selection function by combining a single-layer perforated rectangle resonant component with varactor diodes, to improve the overall performance of the FSS.

To make the above-mentioned objective, features, and advantages of the present disclosure clearer and more comprehensible, the present disclosure will be further described in detail below in conjunction with the accompanying drawings and specific embodiments.

Figure 1:
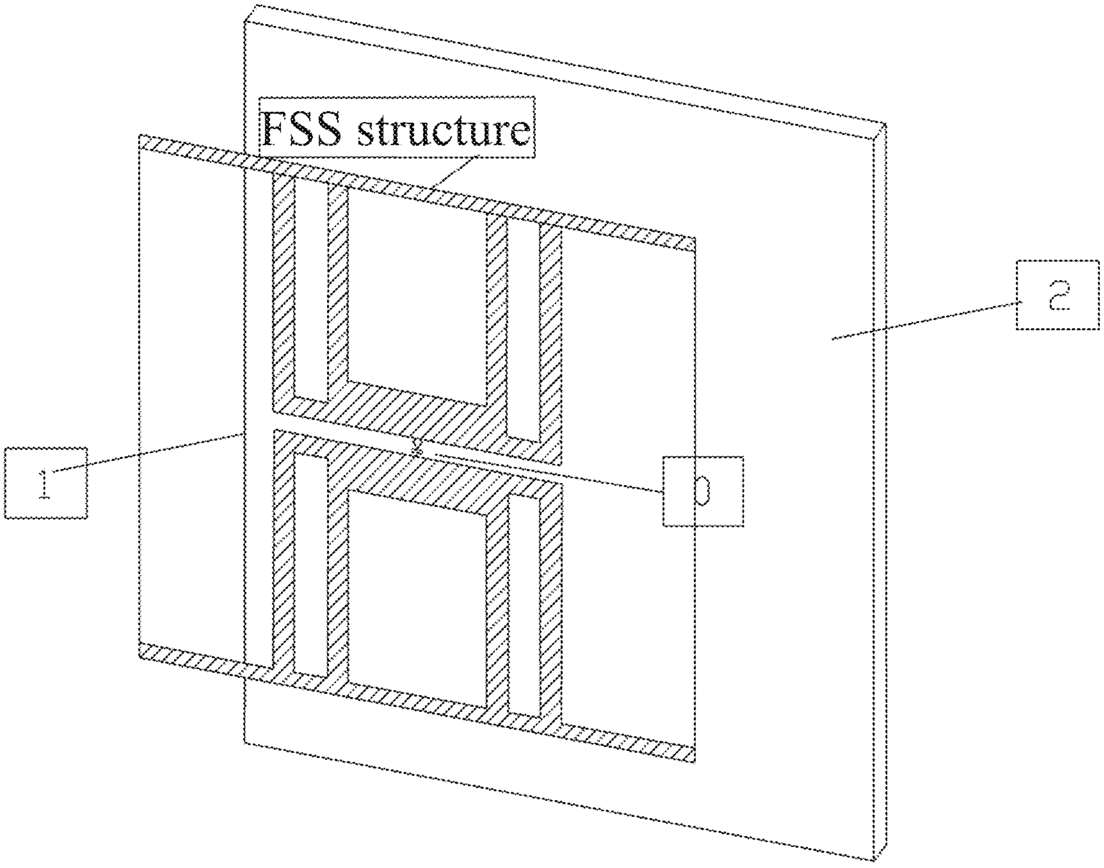
FIG. 1 is a schematic structural diagram of perforated rectangle resonant units of a tunable frequency selective surface (FSS) structure according to the present disclosure.

Referring to FIG. 1, the tunable FSS structure provided by the present disclosure includes a perforated rectangle resonant component 1 and a dielectric substrate 2.

The tunable FSS structure is composed of a plurality of periodically distributed units. Specifically, the perforated rectangle resonant component 1 is of a single-layer structure and is arranged on the dielectric substrate 2. The rectangle resonant component 1 includes a plurality of perforated rectangle resonant units arranged in a matrix. The perforated rectangle resonant units each include two identical rectangle perforated metal patches, and a varactor diode 0 arranged between the two rectangle perforated metal patches, where the two rectangle perforated metal patches are arranged in a mirror image relation.

In the rectangle resonant component 1, the varactor diodes 0 in the perforated rectangle resonant units in the same row are arranged in a same direction, and the varactor diodes 0 in the perforated rectangle resonant units in adjacent rows are arranged in opposite directions. Therefore, in an operation process, the varactor diodes in adjacent rows and the same column have opposite on-load voltage directions, and the varactor diodes in the same row and different columns have the same on-load voltage direction.

In the present disclosure, a group of rectangle perforated metal patches arranged in a mirror image relation may be referred to as a unit pattern, then the varactor diodes are arranged in gaps of the unit pattern and are oppositely staggered and connected in parallel.

In the present disclosure, since the rectangle resonant component is of a unit periodic structure, there is a varactor diode at each gap of the unit pattern, then the capacitance between the gaps of the unit pattern can be changed by adjusting the on-load voltage, thereby achieving the tunable function of the FSS in multiple bands. Specifically, the stopband of the tunable FSS structure is continuously tunable within 2-5 GHz and within 11-12.6 GHz, and a stable stopband is near 20 GHz.

Figure 2:
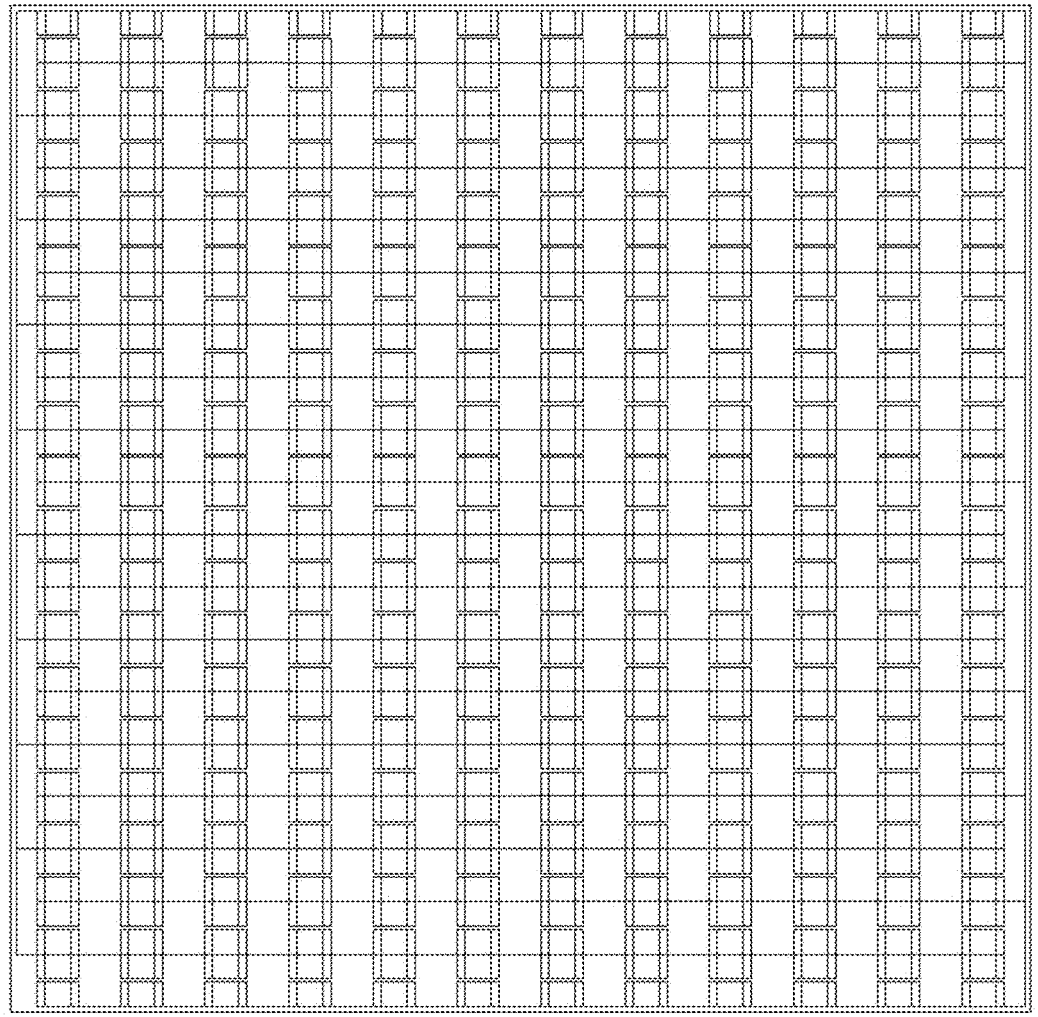
FIG. 2 is a schematic diagram of an array and a connection mode of a tunable FSS structure according to the present disclosure.
Figure 3:
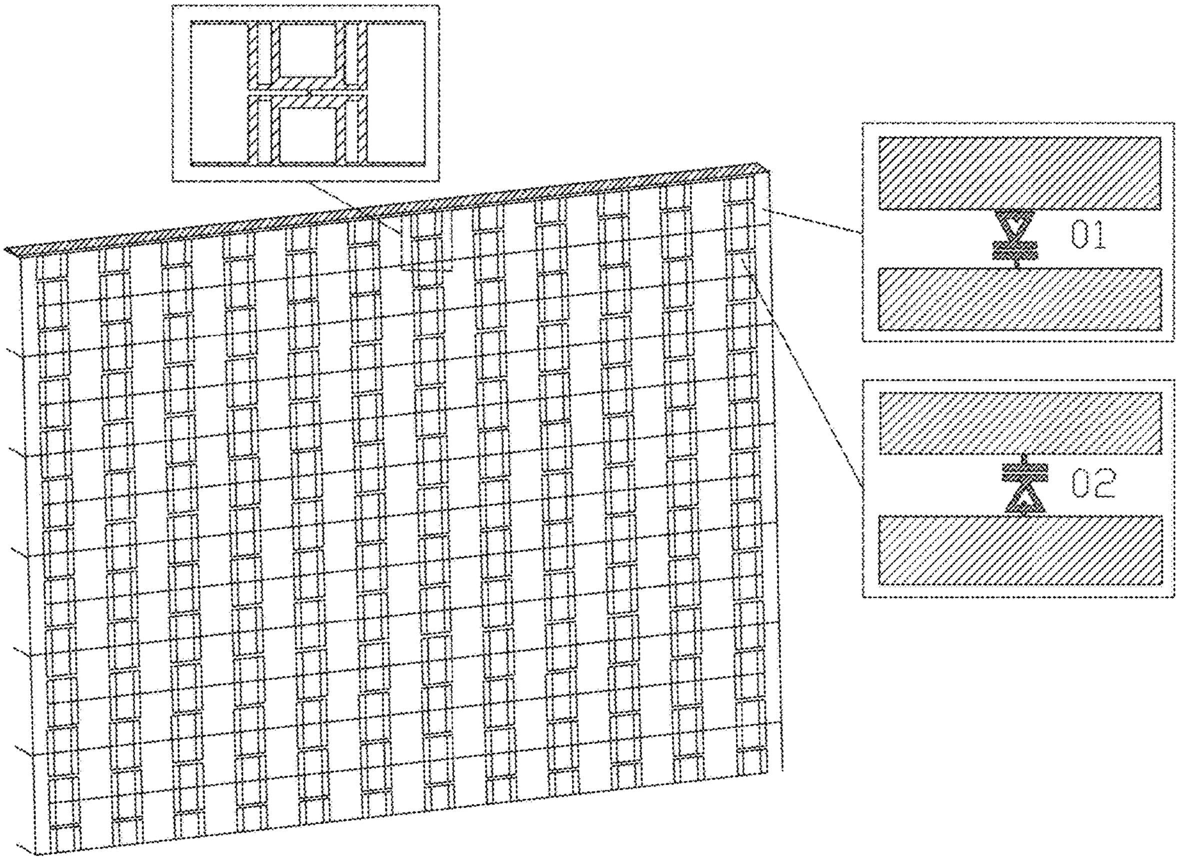
FIG. 3 is an overall schematic diagram of a tunable FSS structure according to the present disclosure.

Please referring to FIG. 2 and FIG. 3, the varactor diode 01 and the varactor diode 02 are adjacent to each other and located in different rows, therefore are in different placement directions. Specifically, the placement directions are opposite. In addition, feed metal wires are staggered, such that the entire circuit is connected in parallel to load the equal voltage.

Figure 4:
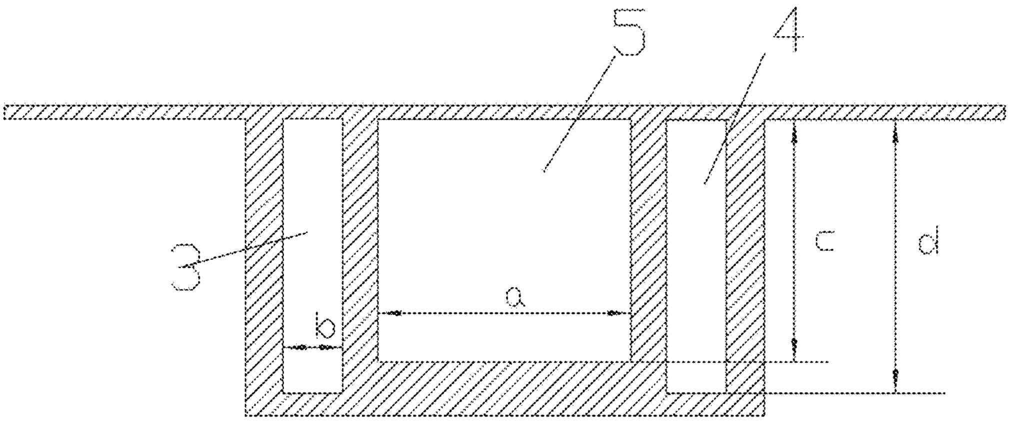
FIG. 4 is a schematic structural diagram of rectangle perforated metal patches according to the present disclosure.

Please referring to FIG. 4, the rectangle perforated metal patches are each provided with three rectangle holes, namely, a first rectangle hole 3, a second rectangle hole 4, and a third rectangle hole 5; and the first rectangle hole 3 and the second rectangle hole 4 are symmetrically arranged on two sides of the third rectangle hole 5. The rectangle perforated metal patches are symmetrical as a whole along the central axis.

The first rectangle hole 3 includes two parallel transverse edges b and two parallel vertical edges d; the second rectangle hole 4 includes two parallel transverse edges b and two parallel vertical edges d; and the third rectangle hole 5 includes two parallel transverse edges a and two parallel vertical edges c.

One end of a first transverse edge of the third rectangle hole 5 is connected to one end of a first transverse edge of the first rectangle hole 3, the other end of the first transverse edge of the third rectangle hole 5 is connected to one end of a first transverse edge of the second rectangle hole 4, and the first transverse edge of the third rectangle hole 5, the first transverse edge of the first rectangle hole 3 and the first transverse edge of the second rectangle hole 4 are located on a same horizontal line; one end of a second transverse edge of the third rectangle hole 5 is connected to one end of a second transverse edge of the first rectangle hole 3, the other end of the second transverse edge of the third rectangle hole 5 is connected to one end of a second transverse edge of the second rectangle hole 4, and the second transverse edge of the third rectangle hole 5, the second transverse edge of the first rectangle hole 3 and the second transverse edge of the second rectangle hole 4 are located on a same horizontal line; and a first vertical edge of the third rectangle hole 5 and a first vertical edge of the first rectangle hole 3 are the same, and a second vertical edge of the third rectangle hole 5 and a first vertical edge of the second rectangle hole 4 are the same.

Furthermore, the rectangle perforated metal patches each further include a first extended edge and a second extended edge.

The first extended edge is an edge passing through a first marking end to extend outward, and the second extended edge is an edge passing through a second marking end to extend outward; the first marking end is the other end of the first transverse edge of the first rectangle hole, and the second marking end is the other end of the first transverse edge of the second rectangle hole.

In the rectangle resonant component, the perforated rectangle resonant units in the same row are connected together through the first extended edge and the second extended edge, such that the varactor diodes in a same row are in parallel connection.

On this basis, the tunable FSS structure provided by the present disclosure further includes a first feed metal wire and a second feed metal wire. The first feed metal wire is arranged on one side of the rectangle perforated metal patches in parallel, and the second feed metal wire is arranged on the other side of the rectangle perforated metal patches in parallel.

The first feed metal wire is connected to one end of a first marking extended edge in the perforated rectangle resonant units in a first column of the matrix, and the second feed metal wire is connected to one end of a second marking extended edge in the perforated rectangle resonant units in a last column of the matrix, where the rectangle perforated metal patches and the feed metal wires are all made of pure copper.

Figure 5:
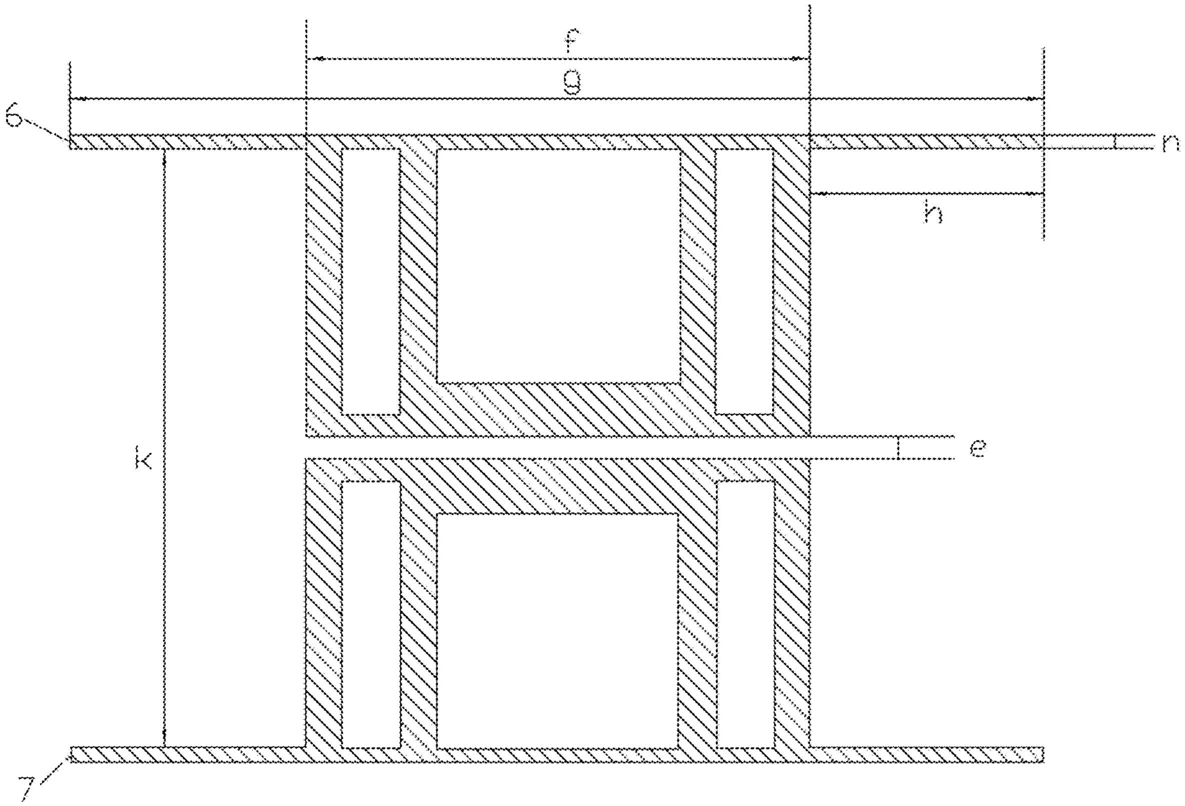
FIG. 5 is a schematic dimensional diagram of rectangle perforated metal patches according to the present disclosure.

Please referring to FIG. 5, the perforated rectangle resonant units each include a first rectangle perforated metal patch 6 and a second rectangle perforated metal patch 7 which are arranged in a mirror image relation; when the perforated rectangle resonant units are located in odd-numbered rows of the matrix, the first marking extended edge is a first extended edge of the first rectangle perforated metal patch 6, and when the perforated rectangle resonant units are located in even-numbered rows of the matrix, the first marking extended edge is a first extended edge of the second rectangle perforated metal patch 7; when the perforated rectangle resonant units are located in odd-numbered rows of the matrix, the second marking extended edge is a second extended edge of the second rectangle perforated metal patch 7, and when the perforated rectangle resonant units are located in even-numbered rows of the matrix, the second marking extended edge is a second extended edge of the first rectangle perforated metal patch 6.

In an operation process, when the varactor diodes have anodes connected to the first rectangle perforated metal patch and cathodes connected to the second rectangle perforated metal patch, when the first feed metal wire is connected to a positive pole of an external power supply, the second feed metal wire is connected to a negative pole of the external power supply, and when the varactor diodes have anodes connected to the second rectangle perforated metal patch and cathodes connected to the first rectangle perforated metal patch, when the first feed metal wire is connected to the negative pole of the external power supply, the second feed metal wire is connected to the positive pole of the external power supply, such that the varactor diodes in adjacent rows and the same column have opposite on-load voltage directions, and the varactor diodes in the same row and different columns have the same on-load voltage direction. Moreover, by changing the voltage value of the external power supply and tuning the on-load voltage, the equivalent capacitance parameter between the first rectangle perforated metal patch 6 and the second rectangle perforated metal patch 7 is changed, thereby tuning a resonant point on the FSS.

The first rectangle hole 3 and the second rectangle hole 4 each have dimensions of 1 mm×4.3 mm, and the third rectangle hole 5 each have dimensions of 4 mm×3.8 mm. specifically, the transverse edges b of the first rectangle hole 3 and the transverse edges b of the second rectangle hole 4 are all 1 mm long; the transverse edges a of the third rectangle hole 5 are 4 mm long; the vertical edges d of the first rectangle hole 3 and the vertical edges d of the second rectangle hole 4 are all 4.3 mm long; and the vertical edges c of the third rectangle hole 5 are 3.8 mm long.

In FIG. 5, f=8 mm, g=16 mm, h=4 mm, k=9.6 mm, and n=0.2 mm.

In the present disclosure, the perforated rectangle resonant units each have dimensions of 16 mm×10 mm, the rectangle perforated metal patches each have dimensions of 8 mm×4.6 mm, and partial wire width of the feed metal wires is 0.2 mm.

In the present disclosure, in the perforated rectangle resonant units, every two of the rectangle perforated metal patches have a gap e of 0.4 mm, and the varactor diodes are located at the gaps.

In the present disclosure, the dielectric substrate 2 is an FR4 substrate, and has a thickness of 0.4 mm.

Figure 6:
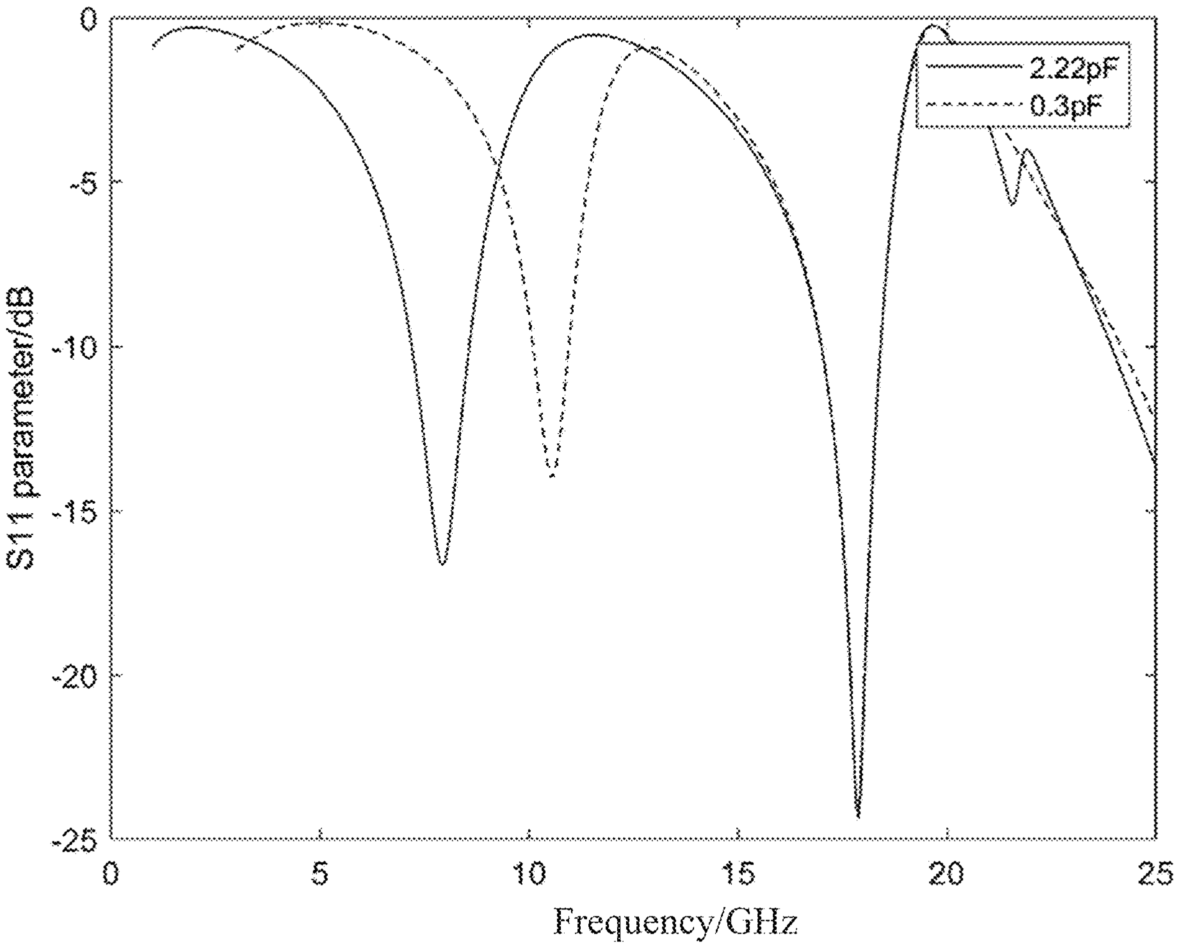
FIG. 6 is a schematic diagram of a reflection characteristic S11 parameter curve of a tunable FSS structure in each frequency band according to the present disclosure.

FIG. 6 is a schematic diagram of a reflection characteristic S11 parameter curve of a tunable FSS in each frequency band according to the present disclosure. By changing the on-load voltage within 0-20 V, the resonant frequency can be continuously tuned within 8-10.6 GHZ, and is stable and unchanged near 18 GHz. The reflection coefficient in a frequency band of 8-10.6 GHz is about −15 dB, and the reflection coefficient at 18 GHz is about −25 dB.

Figure 7:
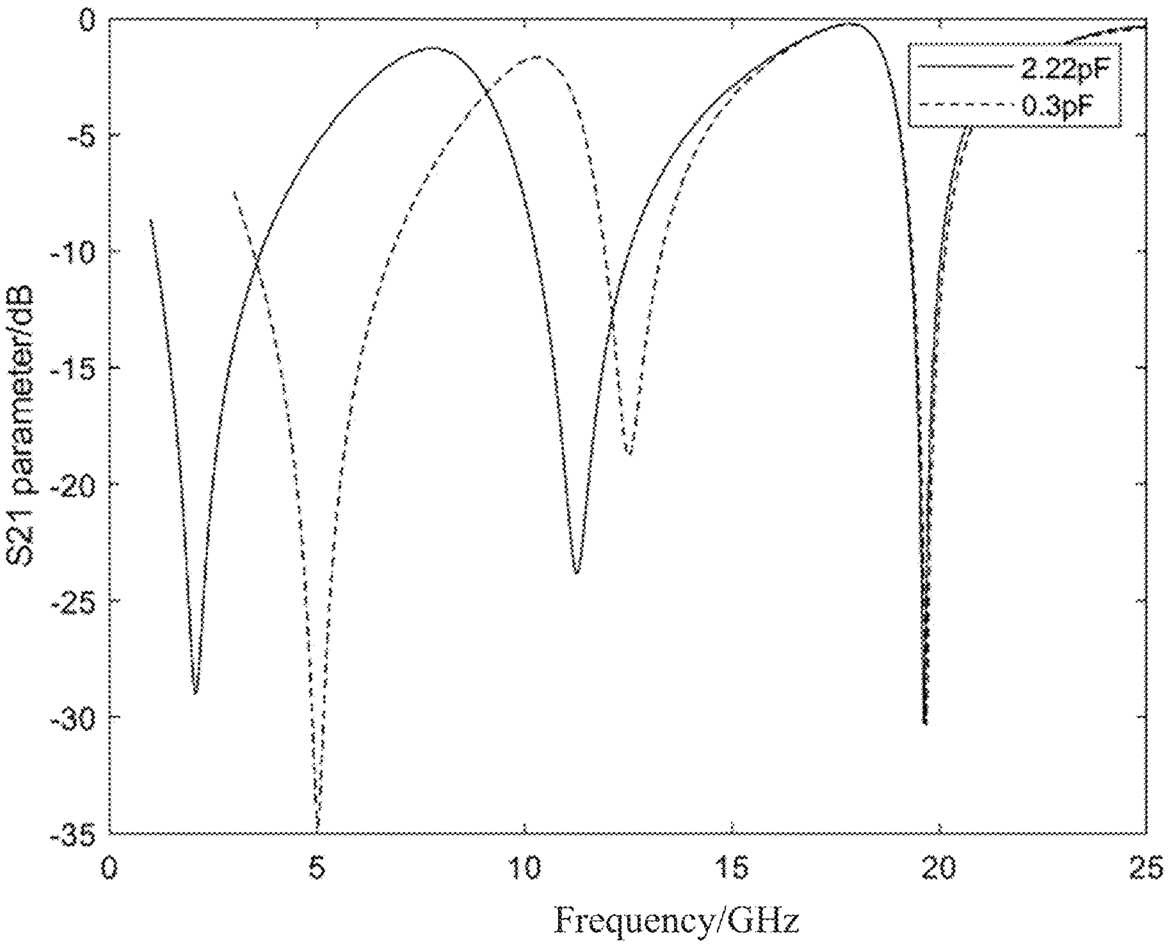
FIG. 7 is a schematic diagram of a transmission characteristic S21 parameter curve of a tunable FSS structure in each frequency band according to the present disclosure.

FIG. 7 is a schematic diagram of a transmission characteristic S21 parameter curve of a tunable FSS in each frequency band according to the present disclosure. By changing the on-load voltage within 0-20 V, the resonant frequency can be continuously tuned within 2-5 GHz and 11-12.6 GHz, and is stable and unchanged near 20 GHz. The transmission coefficient in a frequency band of 2-5 GHz is about-29 dB to −35 dB, the transmission coefficient in a frequency band of 11-12.6 GHz is about-18 dB to −24 dB, and the transmission coefficient at 20 GHz is about-30 dB.

According to the simple tunable FSS structure based on the varactor diodes provided by the present disclosure, by loading a bias voltage of 0-20 V, the capacitance parameter of the diodes is tuned within 0.3-2.22 pF, thereby achieving the tunable function of the FSS and improving the overall performance of the FSS. Specifically, the tuning frequency is continuously tunable within 2-5 GHz and within 11-12.6 GHz, and a stable stopband is near 20 GHz.

The embodiments are described herein in a progressive manner. Each embodiment focuses on the difference from another embodiment, and the same and similar parts between the embodiments may refer to each other.

Specific examples are used herein for illustration of the principles and embodiments of the present disclosure. The description of the foregoing embodiments is used to help understand the method of the present disclosure and the core principles thereof. In addition, those of ordinary skill in the art can make various modifications in terms of specific embodiments and scope of application in accordance with the teachings of the present disclosure. In conclusion, the content of the description shall not be construed as limitations to the present disclosure.

What is claimed is:

1. A tunable frequency selective surface (FSS) structure, comprising:

a dielectric substrate and a rectangle resonant component arranged on the dielectric substrate, wherein the rectangle resonant component comprises a plurality of perforated rectangle resonant units arranged in a matrix;

the perforated rectangle resonant units each comprise two identical rectangle perforated metal patches arranged in a mirror image relation, and a varactor diode arranged between the two rectangle perforated metal patches; and in the rectangle resonant component, the varactor diodes in the perforated rectangle resonant units in a same row are arranged in a same direction, and the varactor diodes in the perforated rectangle resonant units in adjacent rows are arranged in opposite directions;

wherein the rectangle perforated metal patches are each provided with a first rectangle hole, a second rectangle bole, and a third rectangle hole; and the first rectangle hole and the second rectangle hole are symmetrically arranged on two sides of the third rectangle hole;

wherein the first rectangle hole comprises two parallel transverse edges and two parallel vertical edges;

the second rectangle hole comprises two parallel transverse edges and two parallel vertical edges, the third rectangle hole comprises two parallel transverse edges and two parallel vertical edges:

one end of a first transverse edge of the third rectangle hole is connected to one end of a first transverse edge of the first rectangle hole, the other end of the first transverse edge of the third rectangle hole is connected to one end of a first transverse edge of the second rectangle hole and the first transverse edge of the third rectangle hole, the first transverse edge of the first rectangle hole and the first transverse edge of the second rectangle hole are located on a same horizontal line;

one end of a second transverse edge of the third rectangle hole is connected to one end of a second transverse edge of the first rectangle hole, the other end of the second transverse edge of the third rectangle hole is connected to one end of a second transverse edge of the second rectangle hole, and the second transverse edge of the third rectangle hole, the second transverse edge of the first rectangle hole and the second transverse edge of the second rectangle hole are located on a same horizontal line; and a first vertical edge of the third rectangle hole and a first vertical edge of the first rectangle hole are the same, and a second vertical edge of the third rectangle hole and a first vertical edge of the second rectangle hole are the same.

2. The tunable FSS structure according to claim 1, wherein the rectangle perforated metal patches each further comprise a first extended edge and a second extended edge;

the first extended edge is an edge passing through a first marking end to extend outward, and the second extended edge is an edge passing through a second marking end to extend outward;

the first marking end is the other end of the first transverse edge of the first rectangle hole, and the second marking end is the other end of the first transverse edge of the second rectangle hole; and in the rectangle resonant component, the perforated sept rectangle resonant units in the same row are connected together through the first extended edge and the second extended edge, such that the varactor diodes in a same row are in parallel connection.

3. The tunable FSS structure according to claim 2, further comprising a first feed metal wire and a second feed metal wire, wherein the first feed metal wire is connected to one end of a first marking extended edge in the perforated rectangle resonant units in a first column of the matrix, and the second feed metal wire is connected to one end of a second marking extended edge in the perforated rectangle resonant units in a last column of the matrix;

the perforated rectangle resonant units each comprise a first rectangle perforated metal patch and a second rectangle perforated metal patch; when the perforated rectangle resonant units are located in odd-numbered rows of the matrix, the first marking extended edge is a first extended edge of the first rectangle perforated metal patch, and when the perforated rectangle resonant units are located in even-numbered rows of the matrix, the first marking extended edge is a first extended edge of the second rectangle perforated metal patch; when the perforated rectangle resonant units are located in odd-numbered rows of the matrix, the second marking extended edge is a second extended edge of the second rectangle perforated metal patch, and when the perforated rectangle resonant units are located in even-numbered rows of the matrix, the second marking extended edge is a second extended edge of the first rectangle perforated metal patch; and in an operation process, when the varactor diodes have anodes connected to the first rectangle perforated metal patch and cathodes connected to the second rectangle perforated metal patch, when the first feed metal wire is connected to a positive pole of an external power supply, the second feed metal wire is connected to a negative pole of the external power supply, and when the varactor diodes have anodes connected to the second rectangle perforated metal patch and cathodes connected to the first rectangle perforated metal patch, when the first feed metal wire is connected to the negative pole of the external power supply, the second feed metal wire is connected to the positive pole of the external power supply.

4. The tunable FSS structure according to claim 1, wherein the transverse edges of the first rectangle hole and the transverse edges of the second rectangle hole are all 1 mm long; the transverse edges of the third rectangle hole are 4 mm long; the vertical edges of the first rectangle hole and the vertical edges of the second rectangle hole are all 4.3 mm long; and the vertical edges of the third rectangle hole are 3.8 mm long.

5. The tunable FSS structure according to claim 1, wherein the varactor diodes have a capacitance range of 0.3-2.22 pF; and the varactor diodes have an on-load voltage range of 0-20 V.

6. The tunable FSS structure according to claim 1, wherein the perforated rectangle resonant units each have dimensions of 16 mm×10 mm, and the rectangle perforated metal patches each have dimensions of 8 mm×4.6 mm.

7. The tunable FSS structure according to claim 1, wherein in the perforated rectangle resonant units, every two of the rectangle perforated metal patches have a gap of 0.4 mm, and the varactor diodes are located at the gaps.

8. The tunable FSS structure according to claim 1, wherein the dielectric substrate is an FR4 substrate, and has a thickness of 0.4 mm.

* * * * *